United States Patent
Bhatia et al.

(10) Patent No.: US 7,538,045 B2
(45) Date of Patent: May 26, 2009

(54) COATING PROCESS TO ENABLE ELECTROPHORETIC DEPOSITION

(75) Inventors: Tania Bhatia, Middletown, CT (US); Neil Baldwin, Mission Viejo, CA (US); John E. Holowczak, South Windsor, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 11/351,635

(22) Filed: Feb. 10, 2006

(65) Prior Publication Data

US 2006/0244143 A1 Nov. 2, 2006

Related U.S. Application Data

(62) Division of application No. 10/914,905, filed on Aug. 9, 2004, now abandoned.

(51) Int. Cl.
*H01L 21/31* (2006.01)
*H01L 21/469* (2006.01)

(52) U.S. Cl. .................. 438/785; 438/763; 438/648; 257/703; 257/E23.002

(58) Field of Classification Search .................. 438/648, 438/656, 685, 785, 761, 783, 763; 257/E23.002, 257/703
See application file for complete search history.

(56) References Cited

U.S. PATENT DOCUMENTS

| | | | |
|---|---|---|---|
| 5,415,748 A | 5/1995 | Emiliani et al. | |
| 6,254,935 B1 | 7/2001 | Eaton et al. | |
| 6,258,237 B1 | 7/2001 | Gal-Or et al. | |
| 6,770,353 B1 * | 8/2004 | Mardilovich et al. | 428/209 |
| 6,838,157 B2 * | 1/2005 | Subramanian | 428/173 |
| 2003/0181065 A1 * | 9/2003 | O'Donnell | 438/778 |
| 2005/0079343 A1 * | 4/2005 | Raybould et al. | 428/336 |
| 2005/0112381 A1 * | 5/2005 | Raybould et al. | 428/446 |

FOREIGN PATENT DOCUMENTS

| | | |
|---|---|---|
| EP | 1 044 943 | 10/2000 |
| JP | 58081995 | 5/1983 |
| JP | 63-176374 | 7/1988 |
| JP | 03047977 | 2/1991 |
| JP | 09-227254 | 9/1997 |
| JP | 2001089134 | 4/2001 |

OTHER PUBLICATIONS

Zanetti et al., "SrBi2Ta2O9 ferroelectric thick films prepared by electrophoretic deposition using aqueous suspension", Journal of the European Ceramic Society 24 (2004) pp. 2445-2451, Brazil.

Damjanović et al., "Oxidation protection of C/C-SiC composites by an electrophoretically deposition mullite precursor", Journal of the European Ceramic Society 25 (2005) pp. 577-587, Germany.

Chu et al., "Fabrication of YBa2Cu3O7-y superconducting coatings by electrophoretic deposition", Applied Physics letters 55 (1989), No. 5, pp. 492-494, New York, US.

Wang et al., "Novel Fabrication Technique for the production of ceramic/ceramic and metal/ceramic composite coatings", Scripta Materialia 42 (2000) pp. 653-659, UK.

* cited by examiner

*Primary Examiner*—Nitin Parekh
(74) *Attorney, Agent, or Firm*—Bachman & LaPointe, P.C.

(57) ABSTRACT

The present invention relates to a process for the deposition of protective coatings on complex shaped Si-based substrates which are used in articles and structures subjected to high temperature, aqueous environments comprises a non-line-of-sight process, particularly, electrophoretic deposition (EPD) process.

9 Claims, 4 Drawing Sheets

US 7,538,045 B2

COATING PROCESS TO ENABLE ELECTROPHORETIC DEPOSITION

CROSS REFERENCE TO RELATED APPLICATION

This application is a divisional application of application Ser. No. 10/914,905 which was filed on Aug. 9, 2004 now abandoned.

U.S. GOVERNMENT RIGHTS

The invention was made with U.S. Government support under contract N00014-01-C-0032 awarded by the U.S. Navy. The U.S. Government has certain rights in the invention.

BACKGROUND OF THE INVENTION

The present invention relates to an electrophoretic deposition process for the deposition of protective coatings on complex shaped Si-based substrates which are used in articles subjected to high temperature, aqueous environments.

Ceramic materials containing silicon have been proposed for structures used in high temperature applications, for example, gas turbine engines, heat exchangers, internal combustion engines, and the like. A particular useful application for these materials is for use in gas turbine engines which operate high temperatures in aqueous environments. It has been found that these silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 6 mils per 1000 hrs. It is believed that the process involves oxidation of the silicon carbide to form silica on the surface of the silicon carbide followed by reaction of the silica with steam to form volatile species of silicon such as $Si(OH)_x$.

Suitable coatings for articles containing silicon based substrates which are employed in the environments claimed above are well known in the art. See for example U.S. Pat. No. 5,305,726; 5,869,146; 6,284,325; 6,296,941; 6,352,790; and 6,387,456. The prior art described in the foregoing patent documents fail to teach processes for applying protective coating to complex shaped parts such as, for example, integral vane rings and integrally bladed rotors. Typically, such complex shaped parts have been coated by a chemical vapor deposition (CVD) process; however, such CVD processes are limited in that it is only applicable to simple oxide coatings, is limited in terms of thickness and uniformity of the coating layer, and is expensive.

Naturally, it would be highly desirable to provide improved process for the deposition of protective coatings to complex shaped Si-based structures.

Accordingly, it is a principle object of the present invention to provide a non-line-of-sight electrophoretic deposition (EPD) process as aforesaid which is efficient and inexpensive when compared to prior art process.

It is a further object of the present invention to provide a process as aforesaid for applying a conductive coating to the complex shaped Si-based structure.

SUMMARY OF THE INVENTION

The present invention relates to a process for the deposition of protective coatings on complex shaped Si-based substrates which are used in articles and structures subjected to high temperature, aqueous environments. By complex shaped is meant components which have geometric shapes which make physical deposition techniques for depositing coatings difficult, i.e., difficult to coat by line-of-sight processes. Such complexed shaped parts include, for example, integral vane rings and integrally bladed rotors.

The process of the present invention comprises a non-line-of-sight process and, particularly, electrophoretic deposition (EPD) process. The EPD process can be used to deposit green barrier layer(s) on silicon-based substrates of complex shaped articles. The green deposited layers can then be densified by high temperature firing. Chemical vapor deposition (CVD) may be used in conjunction with the EPD process, in order to seal the coatings produced thereby.

When employing an electrophoretic deposition process in accordance with the present invention, it is necessary that the substrate be electrically conducting. The preferred electrophoretic deposition process of the present invention comprises depositing an electrically conductive layer on the substrate prior to depositing the barrier layer(s).

In a further embodiment, an oxide insulating layer is provided between the substrate and the conducting layer.

BRIEF DESCRIPTION OF THE DRAWINGS

Like reference numbers and designations in the various drawings indicate like elements.

DETAILED DESCRIPTION

The present invention relates to a process for the electrophoretic deposition of protective coatings on complex shaped Si-based substrates which are used in structures subjected to high temperature, aqueous environments. By complex shaped structures is meant components which have geometric shapes which make physical deposition techniques for depositing coatings difficult, i.e., difficult to coat by line-of-sight processes, and typical structures include integral vane rings and integrally bladed rotors. The Si-based substrates include, but are not limited to, substrate materials containing SiC, $Si_3N_4$, Silicon-oxy nitrides and mixtures thereof.

Figure 1:
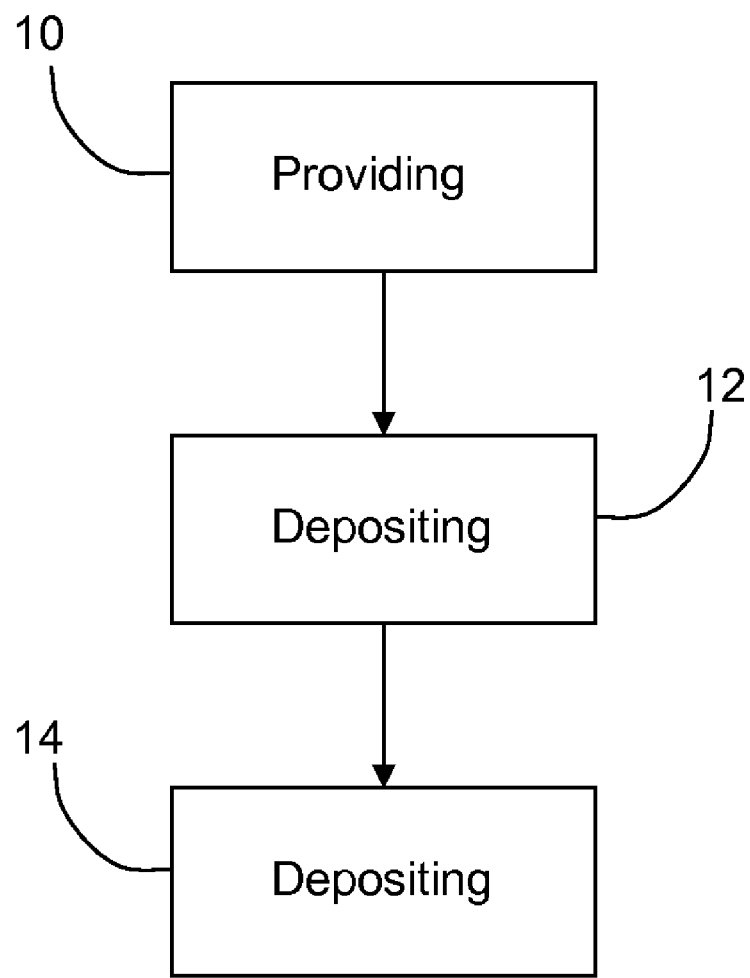
FIG. 1 is a flowcart representing an exemplary process of the present disclosure.

Referring now to the flowchart of FIG. 1, the process of the present invention comprises providing a complex shaped Si-based substrate as described above at step 10, depositing a conductive layer on the substrate at step 12, and thereafter depositing at least one barrier layer by electrophoretic deposition (EPD) as a protective coating at step 14. The conductive layer may be deposited by any method known in the prior art. Particularly suitable methods for depositing the conductive layer include melt coating, chemical vapor deposition, and physical vapor deposition. Melt coating offers an advantageously low cost method to prepare relatively thick coatings on the complex shaped Si-based substrate. The Si-based substrate is heated in contact with the material of the conductive layer to be deposited and above the melting point thereof with the result that molten material completely wets and coats the silicon-based substrate. Whether the conductive layer is deposited by melt coating or chemical/vapor deposition, the deposition of the conductive layer should be carried out, preferably, in a non-oxidizing environment. The material of the conductive layer comprises a material selected from the group consisting of Cr, Ta, Hf, Nb, Si, Mo, Ti, W, Al, Zr, Y and mixtures thereof. Particularly suitable materials are silicon metal and/or an alloy of silicon. The primary advantage of silicon or alloyed silicon is that the silicon reduces the resistance of the surface layer of the silicon-based substrate from about 10 to 100 k-Ohms down to 10 to 500 Ohms. By lowering the resistance, the uniformity of the coating of the barrier material by electrophoretic deposition (EPD) is improved. In addition, alloyed Si is believed to impart creep resistance to the coating.

Figure 2:
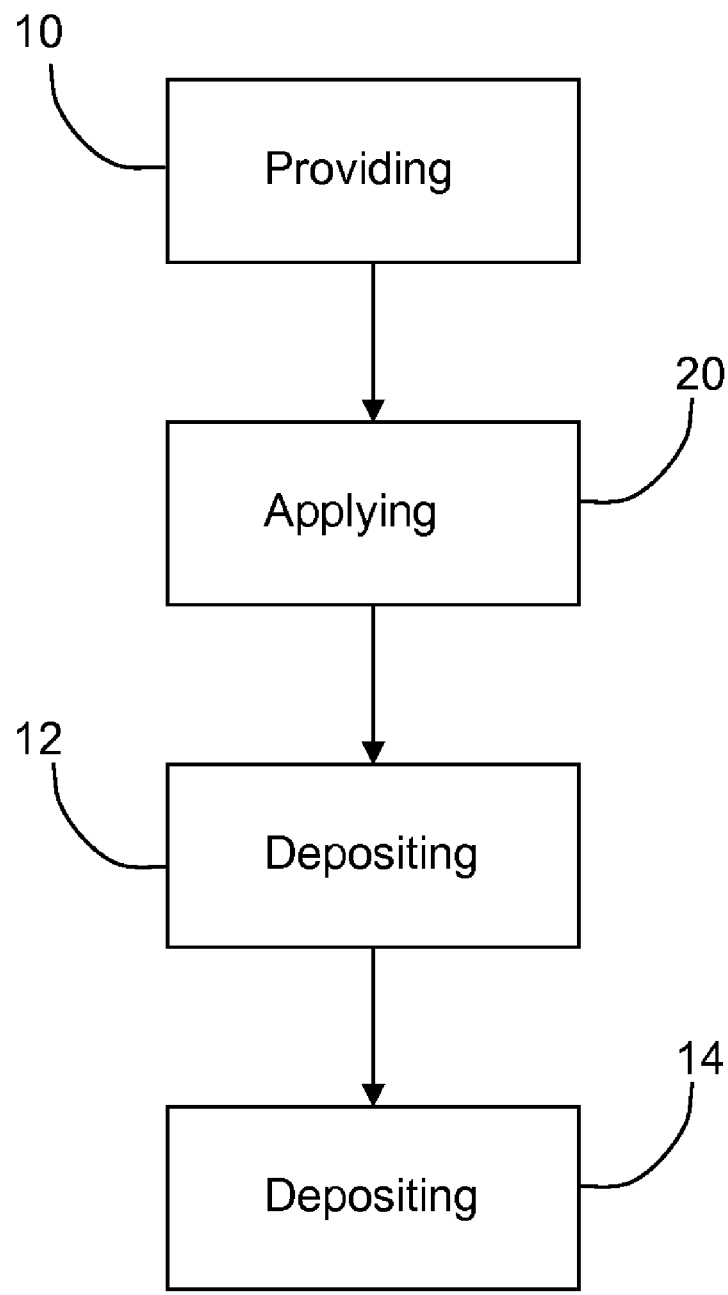
FIG. 2 is a flowchart representing an exemplary alternative process of the present disclosure.

In accordance with one embodiment of the present invention, an electrically insulating layer is applied between the substrate and the electrically conducting layer at step 20 of FIG. 2. It has been found that an advantage of this layer is that it inhibits potential chemical reaction between the silicon in the silicon-based substrate and the conductive layer as well as any layer, such as a bond coat, deposited on the electrically conductive layer. The insulating layer is selected from the group consisting of SiC; $Si_3N_4$; rare earth oxides; oxides of Si, Hf, Zr, Nb, Ta, Ti, Y; and mixtures thereof. It has been found that these materials form acceptable electrically insulating layers which inhibit chemical reaction between the substrate and subsequent bond and/or barrier layers. The oxide insulating layer may be deposited by any of the methods described above with regard to the electrically conductive layer; however, deposition by chemical vapor deposition is a preferred method for the deposition of the insulating layer.

Figure 3:
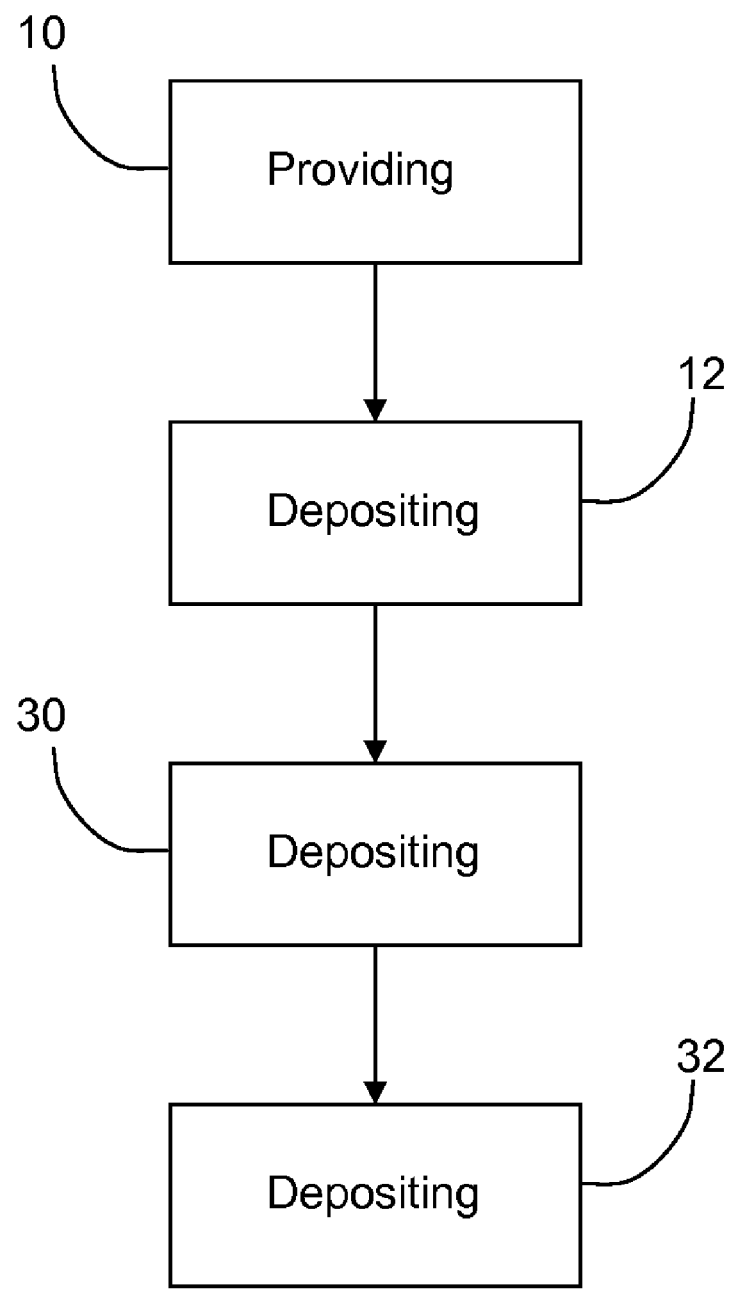
FIG. 3 is a flowchart representing another exemplary alternative process of the present disclosure.

In a further embodiment of the present invention, as noted above, a bond coat may be deposited on the electrically conductive layer prior to the deposition of barrier layers at a step 30 of FIG. 3. In accordance with the present invention, the bond coat comprises a material selected from the group consisting of Cr, Ta, Hf, Nb, Si, Mo, Ti, W, Al, Zr, Y or mixtures thereof. The bond coat may be deposited by chemical vapor deposition, physical vapor deposition, electrostatic deposition, and electrophoretic deposition. The preferred processes for deposition of the bond coat are CVD and EPD. Once the bond coat is applied, the bond coat may be fired at elevated temperature in, preferably, a non-oxidizing environment so as to densify the bond coat. The firing of the bond coat may be carried out at a temperature of between 1000° C. to 1500° C. and the preferred non-oxidizing environment includes nitrogen and/or argon.

Once the bond coat is applied, at least one barrier layer may be applied to the bond coat by electrophoretic deposition at step 32 of FIG. 3. Suitable barrier layer(s) include those barrier layers selected from the group consisting of yttrium monosilicate, yttrium disilicate, rare earth silicates, barium-strontium-aluminosilicates, niobium oxide, tantalum oxide, zirconium oxide, hafnium oxide, titanium oxide, mullite and mixtures thereof. After deposition of the barrier layer(s), a top coat may be applied, if desired at step 34 of FIG. 3. A particularly suitable top coat is described in co-pending application Ser. No. 10/846,968 filed concurrently herewith.

Figure 4:
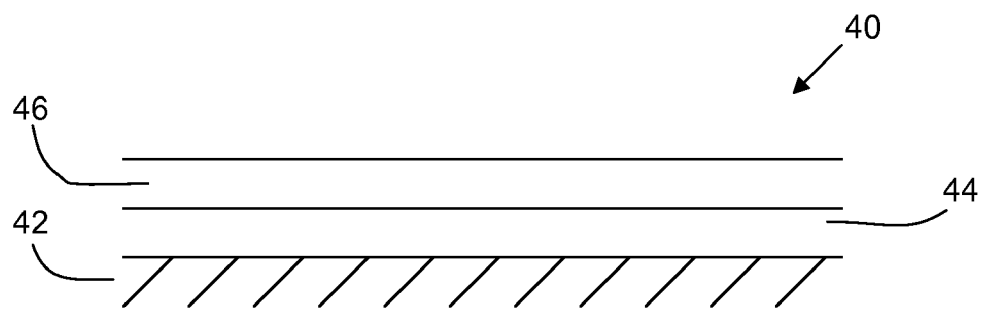
FIG. 4 is a representation of a coated article made according to the exemplary process of FIG. 1.
Figure 5:
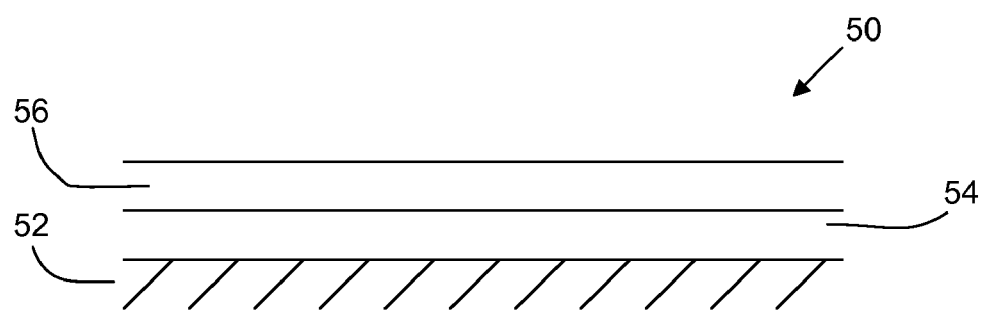
FIG. 5 is a representation of another coated article made according to the exemplary process of FIG. 2.
Figure 6:
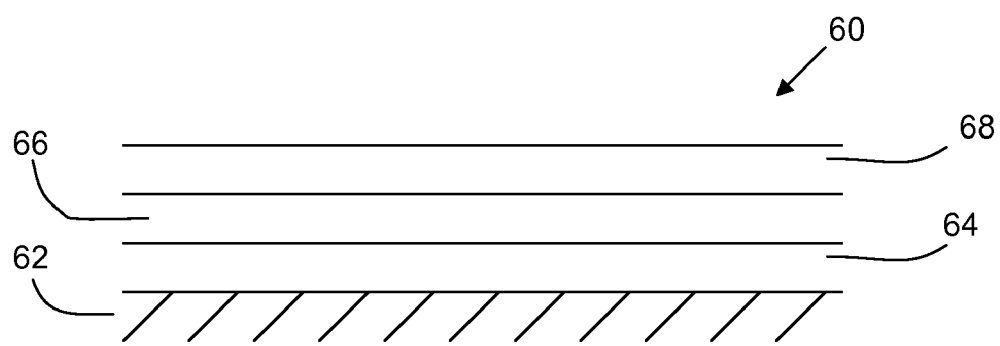
FIG. 6 is a representation of yet another coated article made according to the exemplary process of FIG. 3.

Referring now to FIGS. 4-6, resultant exemplary coated articles made according to the exemplary processes of the present disclosure are shown. A coated article 40 of FIG. 4 may comprise a Si-based substrate 42 having an electrically conductive layer 44 deposited thereupon, and at least one barrier layer 46 deposited upon the electrically conductive layer 44. A coated article 50 of FIG. 5 may comprise a Si-based substrate 52 having an electrically insulating layer 54 deposited thereupon, an electrically conductive layer 56 deposited upon the electrically insulating layer 54 and at least one barrier layer 58 deposited upon the electrically conductive layer 56. And, a coated article 60 of FIG. 6 may comprise a Si-based substrate 62 having an electrically conductive 64 deposited thereupon, a bond coat 66 deposited upon the electrically conductive layer 64, and at least one barrier layer 68 deposited upon the electrically conductive layer 64.

It has been found that the electrophoretic process of the present invention allows for very efficient coating of complex shaped structures. The coatings produced are of sufficient thickness and uniformity so as to have a predictable service life in high temperature environments.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the deposition of protective coatings to complex shaped silicon (Si) based substrates, comprising steps in an order of:
   providing a complex shaped Si-containing substrate;
   depositing an electrically conductive layer upon a surface of the substrate in a non-oxidizing environment by a method selected from the group consisting of chemical vapor deposition, physical vapor deposition and melt coating;
   depositing at least one barrier layer by electrophoretic deposition (EPD) as a protective coating; and
   depositing an intermediate insulating layer between the substrate and the electrically conductive layer,
   wherein the barrier layer is selected from the group consisting of yttrium monosilicate, yttrium disilicate, rare earth silicates, barium-strontium-aluminosilicates, niobium oxide, tantalum oxide, zirconium oxide, hafnium oxide, titanium oxide, mullite and mixtures thereof.

2. A process according to claim 1, wherein the conductive layer comprises a material selected from the group consisting of Cr, Ta, Hf, Nb, Si, Mo, Ti, W, Al, Zr, Y, and mixtures thereof.

3. A process according to claim 2, wherein the conductive layer material is at least one of Si and an alloy of Si.

4. A process according to claim 1, wherein the insulating layer is selected from the group consisting of SiC; $Si_3N_4$; rare earth oxides; oxides of Y, Si, Hf, Zr, Nb, Ta, Ti; and mixtures thereof.

5. A process according to claim 4, wherein the insulating layer is deposited by chemical vapor deposition.

6. A process according to claim 1, wherein the substrate material is selected from the group consisting of SiC, $Si_3N_4$, Silicon oxynitrides and mixtures thereof.

7. A process according to claim 1, further including the step of depositing a bond coat on the conductive layer.

8. A process according to claim 7, wherein the bond coat material is selected from the group consisting of Ta, Hf, Nb, Si, Mo, Ti, W, Al, Zr, Y, Cr or mixtures thereof.

9. A process according to claim 8, wherein the bond coat is deposited by one of electrophoretic deposition and chemical vapor deposition.

* * * * *